United States Patent

Carter

[15] 3,664,385
[45] May 23, 1972

[54] METHOD AND APPARATUS FOR FEEDING AND COMPACTING FINELY DIVIDED PARTICULATE MATERIAL

[72] Inventor: Clarence F. Carter, Danville, Ill.
[73] Assignee: Carter Engineering Company, Danville, Ill.
[22] Filed: Feb. 12, 1971
[21] Appl. No.: 114,897

Related U.S. Application Data

[63] Continuation-in-part of Ser. No. 718,123, Apr. 2, 1968, Pat. No. 3,580,419.

[52] U.S. Cl....................................141/12, 141/67, 141/71, 141/256, 222/413
[51] Int. Cl. .........................................B65b 1/04, B65b 3/04
[58] Field of Search......................222/1, 189, 193, 413, 152, 222/53; 141/7, 71, 81, 59, 67, 286, 296, 257, 5, 12, 4, 6, 10, 68; 55/302, 452

[56] References Cited

UNITED STATES PATENTS 2,142,990  1/1969  Belcher..................................141/256

FOREIGN PATENTS OR APPLICATIONS 634,889  9/1936  Germany..............................141/256

Primary Examiner—Houston S. Bell, Jr.
Attorney—Burns, Doane, Swecker & Mathis

[57] ABSTRACT

A method of feeding and compacting finely divided particulate material which utilizes a first rotating screw feeder for advancing the material along a first sleeve passage provided by a stationary foraminous sleeve mounted closely about the first screw feeder, and a second rotating screw feeder for advancing the material along a second sleeve passage to a container filling station. The method includes the steps of advancing the particulate material axially along the sleeve with the interstitial air between the particles in the sleeve at an internal sleeve pressure. Suction pressure relatively lower than the internal sleeve pressure is applied to the exterior of the sleeve to withdraw air from between the particles of the material to effect compaction of the material. At predetermined times gas pressure relatively higher than the internal sleeve pressure is applied to the exterior of the sleeve to back-flush material from openings in the sleeve to prevent clogging thereof. Cool, dried air may be utilized for back-flushing to cool the material without causing condensation to form within the densifier. The densified material may then be mechanically advanced along the second sleeve passage to the container filling station.

An apparatus for feeding and compacting finely divided particulate material, which includes a housing having fixedly mounted therein a tubular sleeve. The sleeve and housing define at least one closed hollow chamber extending about the sleeve with a plurality of perforations in the sleeve placing the interior thereof in fluid communication with the interior of the chamber. An axially extending screw feeder concentrically and rotatably mounted in the sleeve is adapted to advance material axially along the sleeve, with the interstitial air present between the particles of material in the sleeve at an internal sleeve pressure. Suction means in fluid communication with the chamber applies suction pressure relatively lower than the internal sleeve pressure to withdraw air from between the particles of material to effect compaction thereof. Gas pressure means in fluid communication with the chamber provides gas, preferably cool, dried gas, at a relatively higher pressure than the internal sleeve pressure at predetermined times to back-flush particulate material from the perforations, to prevent clogging thereof. The densifier material is discharged into a second screw feeder which delivers the material to a container filling station while maintaining back pressure on the material in the densifier and while maintaining material compaction.

22 Claims, 7 Drawing Figures

INVENTOR
CLARENCE F. CARTER

BY Burns, Doane, Swecker & Mathis
ATTORNEYS

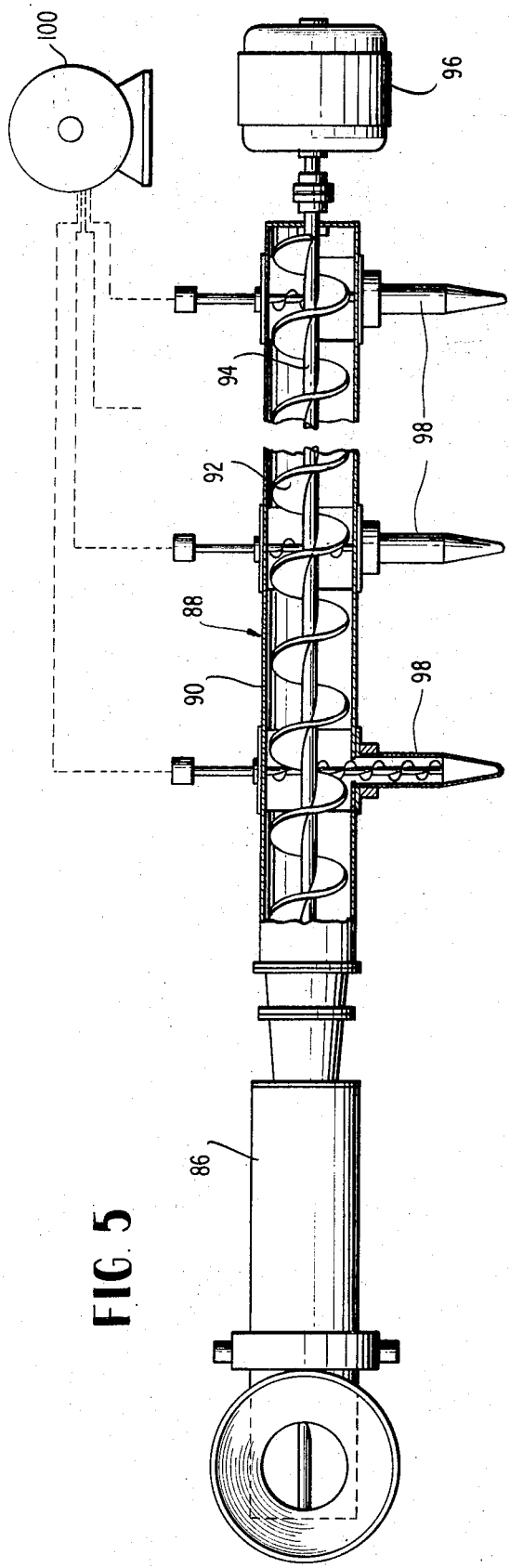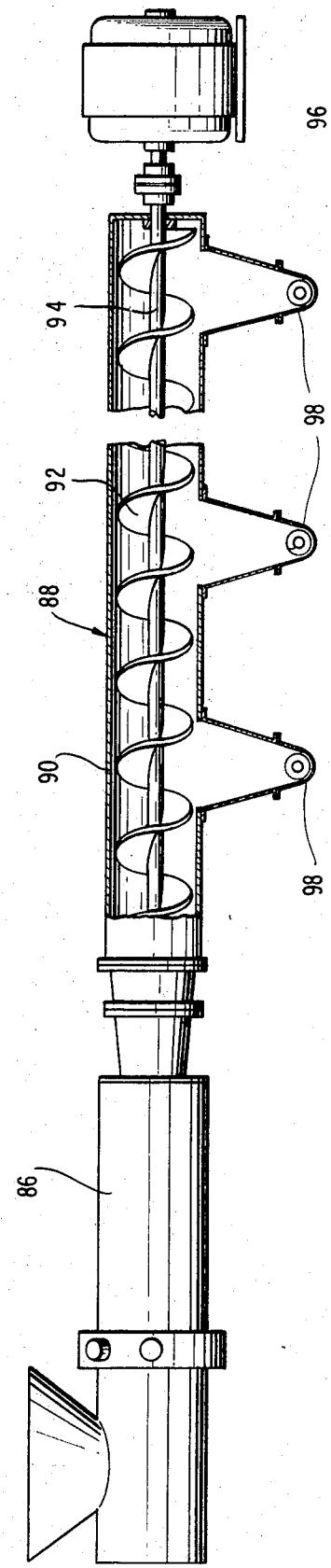

3,664,385

METHOD AND APPARATUS FOR FEEDING AND COMPACTING FINELY DIVIDED PARTICULATE MATERIAL

CROSS-REFERENCE TO RELATED APPLICATION

This application is a continuation-in-part of application, Ser. No. 718,123, by Clarence F. Carter, entitled Method and Apparatus for Feeding and Compacting Finely Divided Particulate Material, filed on Apr. 2, 1968, now U.S. Pat. No. 3,580,419.

BACKGROUND OF THE INVENTION

This invention relates to a method and apparatus for feeding and compacting finely divided particulate material, such as for example fluffy powders and the like.

In handling finely divided particulate material such as fluffy powders, it is sometimes necessary to reduce the bulk of the powder while it is being fed from one location to another and to retain this reduction in bulk while feeding the material into a container. This may be particularly necessary in packaging operations, for a number of reasons. For example, once packaged in containers, such powders have a tendency to settle out during storage and transit with the result that the containers may appear partially empty and underpacked on opening. Additionally, it may be necessary to provide for compaction in order to reduce required container dimensions to an acceptable size.

Accordingly, various systems have heretofore been proposed for simultaneously feeding and compacting materials of this type. One prior system for example utilizes a screw feeder having a helical flight of decreasing pitch so that as the material is advanced into the more closely spaced region of the flight, it is mechanically compressed. Unfortunately, such mechanical compression of fluffy powders may often be undesirable due to the tendency of such particles in the powder to bind together under the influence of the mechanical compression. This may result in providing a product of uneven consistency, and additionally may lead to bridging of the material.

Another approach, intended to obviate the disadvantages of mechanical compression, has been to permit the particulate material to fall downwardly through the interior of a foraminous sleeve while applying vacuum to the exterior of the sleeve to cause air to be removed from the particulate material, thus compacting it. Systems of this type, however, suffer from the disadvantage that the foraminous sleeve may rapidly become clogged with particles of the material. Such clogging has at least two significant disadvantages. Firstly, it may reduce the ability of the perforations, en masse, to transmit suction to the interior of the sleeve, thus reducing the rate at which air is removed from the powder. Secondly, the distribution of the clogging may often be unevenly distributed about the sleeve with the result that suction is unevenly applied to the material during feeding. This may lead to undesirable variations in the consistency of the final compacted material.

Another problem associated with such foraminous sleeve type devices is that the vacuum applied may tend to hold some of the particulate material in static relation against the interior of the sleeve, thus reducing the overall rate at which material may be fed.

Another consideration adding to the problems associated with the compacting of particulate material in transit to a container filling station is the loss of compaction due to reentrainment of air between the particles of the material as it is fed to the filling station and into the container. If the compacted material is permitted to fall freely from the compactor into a gravity feed hopper, or directly into an open container, for example, a reduction in material compaction may result.

Moreover, excessive heating of the particulate material is often experienced in compacting the material and filling containers with the compacted material.

SUMMARY OF INVENTION

It is therefore a general object of the invention to provide a method and apparatus for feeding and compacting finely divided particulate materials, which obviates or minimizes problems of the type previously noted.

It is a particular object of the invention to provide a method and apparatus for feeding and compacting finely divided particulate material in which the material continues to be compacted uniformly and without the loss of compaction during protracted operation and over substantial feeding distances, to provide a final product of particularly even consistency.

It is a more specific object of the invention to provide a method and apparatus for filling containers with compacted particulate material with very little reduction in material compaction.

It is yet another object of the present invention to provide a novel method and apparatus for filling containers with compacted particulate material while simultaneously preventing excessive heat buildup in the material.

It is yet a further object of the present invention to provide a novel method and apparatus for simultaneously filling a plurality of containers with compacted particulate material from a single densifier.

A method of feeding and compacting finely divided particulate material, intended to accomplish at least some of the foregoing objects utilizes a first rotating screw feeder for advancing the material through a stationary foraminous sleeve mounted closely about the first screw feeder and to a second screw feeder which feeds the compacted material to a container filling station. The method includes the steps of advancing the particulate material axially through the foraminous sleeve with the interstitial air between particles of the material in the foraminous sleeve being at an internal sleeve pressure. A suction pressure relatively lower than the internal sleeve pressure is applied to the exterior of the foraminous sleeve to withdraw air from between the particles of the material to effect compaction of the material. Gas at a gas pressure relatively higher than the internal sleeve pressure is applied to the exterior of the foraminous sleeve at predetermined times to back-flush particulate material from the perforations in the foraminous sleeve to prevent clogging thereof. The gas utilized for back-flushing may be cooled and dried to cool the material as it passes through the densifier. The compacted material is discharged from one end of the first screw feeder into the second screw feeder while simultaneously preventing substantial gas pressure from entering the end of the first feeder, and the material is advanced to at least one filling station while retaining the material compaction.

In a further method aspect of the invention the step of applying gas pressure includes the further steps of providing non-communicating, closed hollow chambers about different peripherally spaced areas of the first sleeve. The gas pressure is then applied to each of the chambers in turn at predetermined times during which the other of the chambers has suction pressure applied thereto. In this manner the pressure differential across the perforations in the sleeve is increased to assist the back-flushing action.

An apparatus for feeding and compacting finely divided particulate material, according to a preferred embodiment of the invention includes a housing having fixedly mounted therein a first tubular sleeve. The first sleeve and adjacent interior portions of the housing define at least one closed hollow chamber extending about the first sleeve. The first sleeve further includes a plurality of perforations placing the chamber in communication with the interior of the first sleeve. An axially extending screw feeder concentrically and rotatably mounted in the first sleeve feeds particulate material axially along the first sleeve with the interstitial air present between the particles in the material being at an internal sleeve pressure. Suction means connected with the housing is placed in fluid communication with the chamber to apply a suction pressure relatively lower than the internal sleeve pressure to withdraw air from the particulate material, thus effecting compaction of it. Gas pressure means connected with the housing, is placed in fluid communication with the chamber at predetermined times for supplying gas at a gas pressure relatively higher than the internal sleeve pressure to the perforations. The gas may be air at atmospheric pressure or may be cool, dried air from an air supply system. In this manner, the particulate material is periodically back-flushed from the perforations in the first sleeve to prevent clogging. The material is also cooled and dried during the densifying or compacting cycle to further prevent clogging and heat buildup. The compacted material is discharged from a material discharge means at an outlet end of the first sleeve into a second sleeve while maintaining a back pressure on the material. The discharged compacted material is advanced from the material discharge means to a container filling station through the second sleeve by a second screw feeder which maintains the back pressure. A container is then filled with the compacted material at the filling station.

Where it is desired to convey compacted material to a plurality of container filling stations, a number of screw feeders each of lesser capacity than the second screw feeder and disposed laterally with respect thereto may be provided. The total capacity (total volume of material conveyed per unit time) of all of these laterally disposed screw feeders together may be approximately equal to the total capacity of the second screw feeder so that the flow of material through the second screw feeder is sufficient to supply all of the laterally disposed feeders. However, to facilitate the removal of filled containers and the replacement thereof by empty containers without causing any material backup which might lead to excessive packing, the total capacity of the laterally disposed screw feeders may be slightly greater than the capacity of the second screw feeder. Thus, when one of the laterally disposed screw feeders is not turning or is otherwise prevented from supplying material to its associated filling station while changing containers, the remaining feeders are able to handle the material flow through the second screw feeder without causing excessive material buildup and packing. With the preferred arrangement, wherein the laterally disposed screw feeders are axially spaced along the second screw feeder, when all of the laterally disposed screw feeders are in operation only that container filling station at the end of the line, i.e. opposite the outlet end of the first screw feeder in the densifier, will be operating at less than full capacity. Thus, the second screw feeder remains filled with material for a sufficient length to provide the desired back pressure at the discharge or outlet end of the densifier.

In a further aspect of the invention, partition means are provided extending between the first sleeve and the housing, to divide the chamber into at least two axially extending, non-communicating subchambers extending peripherally about different portions of the first sleeve. The suction means further includes first and second suction means each communicating different ones of the subchambers. Similarly, the gas pressure means includes first and second gas pressure means each communicating with different ones of the subchambers. In operation each of the gas pressure means is connected in turn to its associated pressure subchamber at a time during which the other of the subchambers is concurrently connected to its associated suction means. In this manner an increased pressure differential to assist in back-flushing gas through the perforations in the first sleeve is created.

THE DRAWINGS

An apparatus for feeding and compacting finely divided particulate materials according to a preferred embodiment of the invention, is illustrated in the accompanying drawings in which.

DETAILED DESCRIPTION

General Summary

Figure 1:
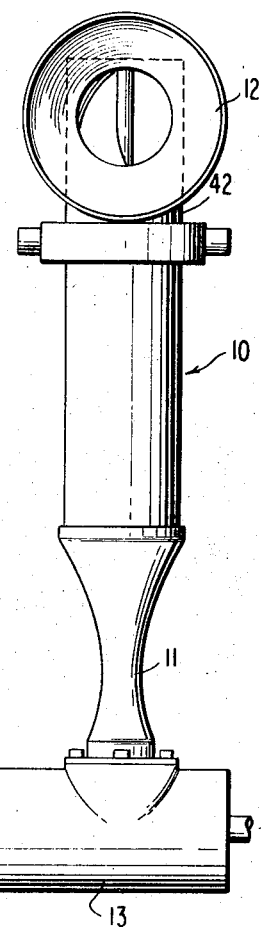
FIG. 1 is a plan view of an apparatus according to a preferred embodiment of the invention.

Referring to FIG. 1 of the drawings, an apparatus for feeding and compacting finely divided particulate material according to a preferred embodiment of the invention is there shown.

Figure 2A:
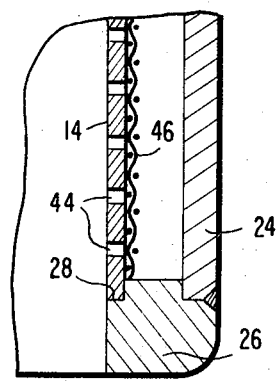
FIG. 2A is a cross-sectional view of a portion of the apparatus of FIG. 2 on an enlarged scale.
Figure 2:
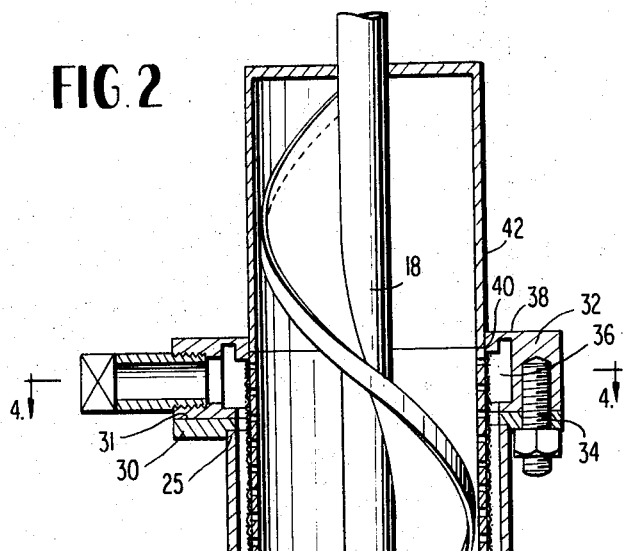
FIG. 2 is a cross-sectional plan view of the apparatus shown in FIG. 1.

The apparatus includes a generally horizontal housing, generally designated 10 connected to the lower end of a conventional hopper 12 containing a mass of the particulate material. Positioned within the housing 10 is an axially extending foraminous, circular sleeve 14 (FIG. 2), having an axially extending internal sleeve passage communicating at its one end 25 with the interior of the hopper 12. The housing 10 generally defines an enclosed hollow chamber 16 extending about the sleeve. Extending through the sleeve 14 is a concentric circular shaft 18 supported in fixed relation to the sleeve for rotation relative thereto, by suitable conventional bearing structure (not shown) connected with the housing. A screw flight 20, fixedly secured to the shaft 18, extends between the shaft and the interior of the sleeve and advances the particulate material axially through the sleeve passage from the hopper 12 during rotation of the shaft 18.

Suction at a pressure lower than that within the sleeve is applied to the chamber 16 (as will be described) to withdraw the interstitial air from between the particles of material as it is being fed through the tube, to cause the material to become compacted. To prevent the vacuum from causing some of the particulate material to adhere in static condition to the interior of the sleeve, the conveyor flight 20 is provided with a thin sheet metal lip 22 projecting toward the direction of material travel secured to the peripheral edge of the flight, which shears any adhered powder from the interior of the sleeve. At predetermined times, air is supplied to the chamber 16 at a pressure higher than that in the interior of the sleeve to cause air to pass in a reverse direction through the sleeve perforations to back-flush particulate material therefrom to prevent clogging. The above-described apparatus is substantially the same as that described in the previously referenced Carter application, U.S. Pat. No. 3,580,419. Back-flushing is also described in Carter application, Ser. No. 33,775, filed May 1, 1970, now U.S. Pat. No. 3,605,826, for Method and Apparatus for Filling Containers. Moreover, an augerless densifier and feeder is described in Carter application, Ser. No. 112,292, filed on Feb. 3, 1971, for Method and Apparatus for Feeding and Compacting Finely Divided Particulate Material. The disclosures of the three above referenced applications are hereby incorporated by reference.

Figure 3:
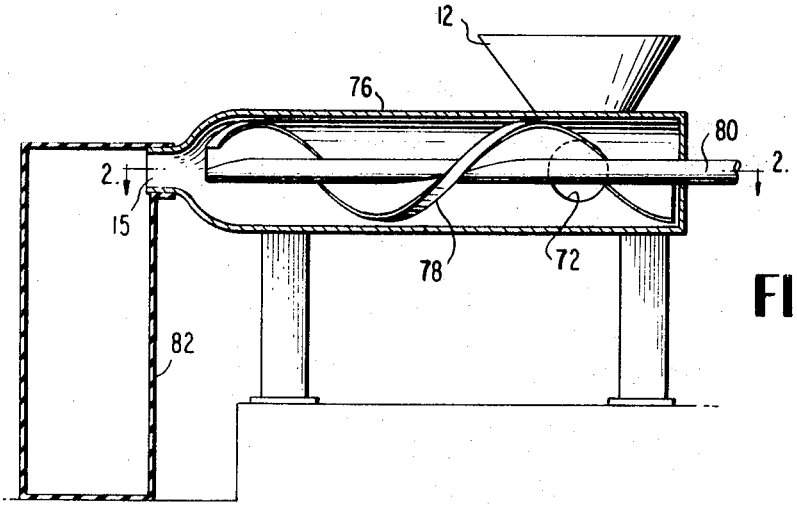
FIG. 3 is an elevation in cross section of the apparatus shown in FIG. 1, taken along the line 3—3.

The housing 10 is coupled through a flexible coupling 11 to a second rotating screw feeder 13. The compacted material is discharged from the housing 10 through the flexible coupling into the screw feeder 13 which conveys the compacted material to a discharge port 15 adjacent a container filling station. The discharge port 15 is preferably adapted to receive a collapsed bag container (FIG. 3), i.e. a bag container having substantially all gases removed therefrom, which may be filled with a predetermined volume or weight of the particulate material.

Detailed Structure

In more detail, the housing 10 includes an axially extending, horizontally disposed, tubular metal body 24 of circular cross section. An inwardly extending, vertically disposed annular end plate 26 is fixedly secured to the end 23 of the tube 24 opposite the hopper 12 by welding, although other conventional methods may be used. The bottom plate 26 includes an inwardly facing, peripherally extending rectangular notch 28 (FIG. 2(A)) which receives and supports the end 23 of the sleeve 14 and locates it in spaced concentric relation to the interior of the tubular body 24. At the end 25 adjacent the hopper 12, the tubular body 24 is fixedly secured to a radially outwardly extending, annular end plate 30 (FIG. 2) spaced radially from the sleeve 14 and having a flat vertical surface 31.

An annular member 32 is fixedly secured to the flat vertical surface 31 of the end plate 30 by suitable elongate threaded connectors 34. The member 32 extends axially toward the hopper 12 and is provided with a peripherally extending, internal chamber 36 facing toward the sleeve 14 and communicating with the previously mentioned annular space 16 between the tubular body 24 and the sleeve. The member 32 also includes a peripherally extending flange 38 projecting radially inwardly adjacent the upper end of the member 32 and provided with a peripherally extending, rectangular notch 40 for receiving and supporting the end 25 of the sleeve 14 and locating it concentrically of the housing.

In order to prevent leakage of air, a seal between the sleeve 14 and the housing 10 at both ends 23 and 25 of the sleeve 14 is provided by the use of suitable sealing materials between the notches 40 and 28 and the sleeve.

The previously mentioned conveyor flight 20 is formed of sheet metal extending in helicoidal fashion about the shaft 18 and is rotated by conventional means (not shown) in such a direction as to advance material from the hopper 12 through the sleeve 14. At its end 25, the sleeve 14 and the conveyor communicate through a closed cylindrical end housing 42 with a hopper 12 containing a supply of the particulate material. The material in the supply contains a certain amount of interstitial air between the particles in the material. Usually this interstitial air will be at substantially atmospheric pressure although use of a supply functioning at pressure above or below atmospheric pressure is possible. As the material is fed through the sleeve the interstitial air is at an internal sleeve pressure substantially equal to that prevailing in the supply, i.e., usually atmospheric pressure.

During passage of the material by the screw conveyor through the sleeve, the previously mentioned suction pressure is applied to the exterior of the sleeve. This suction pressure is less than the internal sleeve pressure to cause a large portion of the interstitial air to be sucked out of the conveyed material, thus compacting it. For example, utilizing a supply under atmospheric pressure, the suction pressure may typically be of the order of 25 inches Hg of vacuum.

As suction is applied to the sleeve 14, however, some of the particulate material may tend to become held statically by the vacuum to the interior surface of the sleeve 14, thus resisting motion axially through the sleeve. To provide for removal of this static powder, the previously mentioned thin sheet metal lip 22 secured to the conveyor flight along the outer peripheral edge thereof extending axially downstream, is provided. The lip efficiently shears the powder from the interior surface of the sleeve to ensure that all the powder is fed down through the sleeve at a uniform rate.

In addition, the lip insures that the interior of the sleeve is blanked off from vacuum for a relatively substantial area adjacent the shearing edge of the lip so that the powder is only loosely attached at the time of shearing. This prevents the effect of suction extending about the edge of the screw flight alone which might otherwise tend to hold some particles in position even during scraping.

To render the sleeve 14 foraminous, a plurality of radial perforations 44 spaced regularly along and about the sleeve are provided. For reasons of ease of manufacture the perforations 44 are usually likely to be greater than the average particle size of the powders transported. In order, therefore, to prevent particles from being sucked through into the chamber 16, a mesh screen 46 having smaller mesh openings than the size of the particles in the transported material, is disposed in contiguous overlapping relation to the exterior surface of the sleeve extending between the end plate 23 and the flange 38. The mesh screen 46 prevents the passage of particles through the perforations 44 into the chamber 16 in order to prevent the chamber from becoming filled up with powder.

Figure 4:
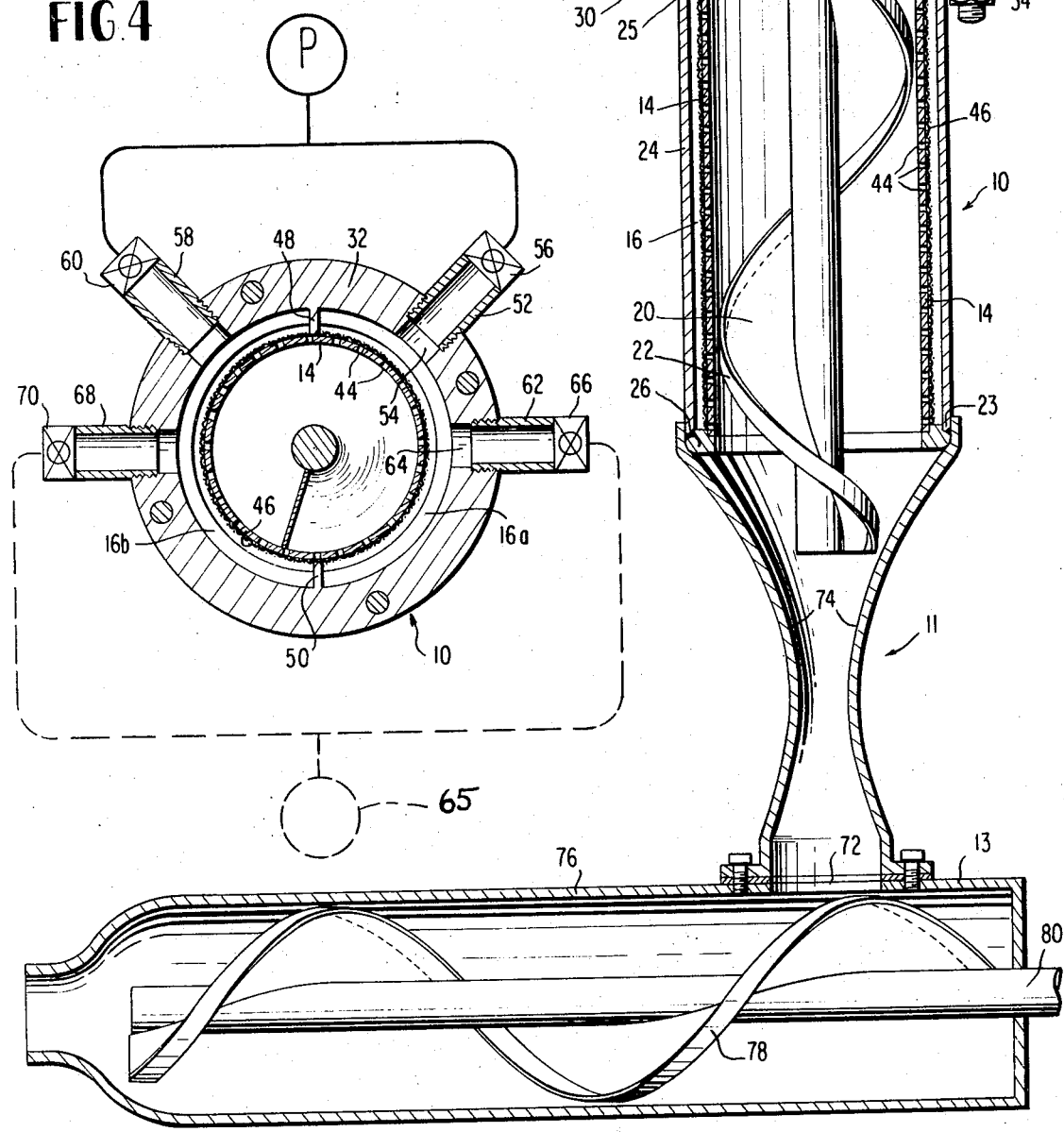
FIG. 4 is a cross-sectional top view of the portion of the apparatus shown in FIG. 2 taken along the lines 4—4 therein.

Referring to FIG. 4, the previously mentioned annular chamber 16 together with the chamber 36 in the member 32 is divided by two diametrically opposed partitions 48 and 50 into two non-communicating, axially extending subchambers 16a and 16b extending about opposite peripheral halves of the exterior of the sleeve. The partitions 48 and 50 are fixedly secured to the housing 10 and the sleeve 14, extending axially between the sleeve and housing.

Suitable sealing materials are applied at the junction between the inner ends of the partitions 48 and 50 and adjacent portions of the mesh screen 46 overlying the exterior of the sleeve to prevent leakage of air between the partitions and the exterior of the sleeve.

To provide for the application of suction to the interior of the subchamber 16a, a conduit 52, threadedly engaged with a radially extending opening 54 in the member 32, is provided. The conduit 52 at one end communicates through the opening 54 with the interior of the subchamber 16a and at its remote end communicates with a suitable source of suction such as a vacuum pump P through a selectively controlled first suction valve 56 interposed in the conduit 52. When the valve 56 is selected to be open, vacuum is applied to the interior of the chamber 16a to suck air outwardly through the sleeve, thus compacting adjacent particulate material fed through the sleeve by the screw conveyor.

A similar conduit 58 and second suction valve 60 for applying suction to the subchamber 16b are also provided.

After a certain period of feeding, some of the perforations 44 are likely to have become clogged with particles of the material being fed. It is necessary to remove this material in order that vacuum may still be applied evenly to the interior of the sleeve.

For this purpose another conduit 62 threadedly engaged with a corresponding opening 64 extending radially through the member 32, is provided. The conduit 62 communicates at its inner end with the subchamber 16a through the opening 64 and its remote end communicates with openable first gas valve 66 interposed in the conduit 62. For example, air at less than 60° F. and 40 percent relative humidity may be utilized to aid in cooling and drying the material which may otherwise become as hot as 190° F.

A similar conduit 68 and second gas valve 70 are provided for placing the subchamber 16b in fluid communication with atmosphere or the air source 65.

The valves 56, 60, 66 and 70 enable the pressure conditions within the housing 10 to be regulated in the following manner. For a majority of the time the gas valves 66 and 70 are closed, with the suction valves 56 and 60 concurrently open to apply suction pressure to the subchambers 16a and 16b so that suction is applied about the entire peripheral area of the sleeve to remove air from the particulate material being fed.

At a predetermined time, the first gas valve 66 is opened and the first suction valve 56 closed, so that atmospheric pressure or the cooled, dried air at atmospheric pressure is admitted to the subchamber 16a. At the same time, suction is still being applied to the subchamber 16b communicating with the interior of the sleeve with the result that the internal sleeve pressure is reduced below atmospheric pressure. Thus, the atmospheric air admitted through the valve 66 constitutes a source of gas at relatively higher pressure than the internal sleeve pressure. This pressure differential (with the exterior of the sleeve exposed to atmospheric pressure and the interior still communicating with a vacuum source) causes any accumulated particulate materials in the perforations 44 to be back-flushed out of the perforations into the interior of the sleeve to unclog them. In addition, when cooled, dried air is utilized during back-flushing, excessive heat and moisture buildup in the material is prevented. After an adequate period of time to allow for unclogging to be completed, but preferably insufficient to allow the vacuum within the sleeve to drop below about 5 inches Hg vacuum, the first gas valve 66 is closed and the first suction valve 56 reopened to once again apply suction to the subchamber 16a.

At another predetermined time, the second suction valve 60 is closed and the second gas valve 70 opened, to place the subchamber 16b in fluid communication with atmosphere or the cooled, dried air supply 65 at a time when the subchamber 16a still has vacuum applied thereto. At this time, the perforations 44 in that portion of the sleeve communicating with the subchamber 16b, will be back-flushed in a manner similar to that just described.

This process may be repeated on a regular basis to keep the sleeve 14 operating in a substantially unclogged condition during continued feeding of the particulate material, utilizing suitable timing mechanism.

The compacted material is discharged from the discharge end of the sleeve passage formed by the sleeve 14 through the flexible coupler or sleeve 11 into the second screw feeder 13 by way of an inlet port 72. The second screw feeder 13 includes a cylindrical sleeve 76 and a screw flight 78 coaxially mounted therein on a conventionally driven shaft 80.

The discharge port 15 of the second screw feeder 13 is preferably of smaller diameter than the sleeve 76 and is preferably formed by gradually and smoothly sloping the outer wall of the sleeve 76 inwardly as illustrated. Thus, an evacuated bag container 82 may be connected to the outer port 15 at the container filling station (FIG. 3) for filling with compacted particulate material with little loss of compaction.

The walls 74 of the flexible sleeve 11 preferably converge inwardly to somewhat restrict the flow of material from the first screw feeder in the housing 10 to the second screw feeder 13. It is preferred that this restrictive passage apply some back pressure to the material to aid in compacting the material. However, this restrictive passage need not be utilized since the second screw feeder will provide sufficient back pressure and prevent the influx of air through the discharge end of the first screw feeder. Should some air be drawn from the outlet port 15 through the second screw feeder 13 and through this restrictive passage by the vacuum applied to the chamber 16, the interior of a substantially evacuated impermeable bag container 82, connected to the outlet port 15 will be subjected to the slightly lower than atmospheric pressure within the sleeve 76 thereby maintaining the bag in its collapsed state until filled by the compacted material and thereby aiding in the retention of material density rather than detracting therefrom.

As described above, since a second screw feeder is utilized, a flow restrictor or back pressure device is not necessary for proper operation of the compactor section. For example, by maintaining the flow rate of compacted material through the second screw feeder approximately equal to the flow rate of material through the compactor section, the second screw feeder will provide the back pressure necessary to ensure proper compaction of the particulate material in the compactor section. It should be noted that "flow rate" as utilized herein does not necessarily mean speed. The speeds of the two screw feeders may differ depending upon their relative diameters. However, the volume of material advanced in a predetermined time period through one screw feeder should be approximately equal to the volume of material advanced in the same time period through the other screw feeder.

In addition to the above, the first and second screw feeders are preferably constructed from a highly, thermally conductive material such as iron or steel. Thus, a highly thermally conductive path is provided through the compacted material in the first and second sleeve passages, reducing the retention of heat by the material. This, together with the use of cool, dried air for back-flushing the screen in the densifier, reduces material heating and provides a more uniformly compacted end product.

A plurality of container filling stations may be supplied with compacted material as illustrated in FIGS. 5 and 6.

Referring now to FIGS. 5 and 6, a horizontally disposed densifier 86 of the type previously described in connection with FIGS. 1-4 supplies compacted material to a horizontally disposed, substantially coaxial screw feeder 88. The screw feeder 88 includes a sleeve passage 90 and an auger 92 mounted on a shaft 94 extending coaxially through the sleeve passage. The shaft 94 may be driven in a suitable conventional manner, for example, by a motor 96.

Beneath the screw feeder 88 and disposed laterally with respect thereto are a plurality of screw feeders 98 each including a sleeve passage and an auger and each communicating with the interior of the sleeve passage 90. Each of the screw feeders 98 is provide with a material discharge means 99 at one end thereof adjacent the container filling station. This material discharge means may be, for example, the same as the material discharge means 15 of FIG. 3. The screw feeders 98 may be of equal capacity, i.e. the flow rate through each screw feeder 98 may be the same, but are individually of lesser capacity than the screw feeder 88. Moreover, as was previously discussed, the total capacity or feed rate of the screw feeders 98 together is approximately equal to or greater than the capacity or feed rate of the screw feeder 88. This insures that there is no excessive material backup within the screw feeder 88. In addition, if the total capacity of the screw feeders 98 exceeds the capacity of the feeder 88, the removal of a filled container such as an impermeable bag and the replacement with an empty container is facilitated since the end screw feeder 98 will take up the increased material supply when the flow of material through one of the feeders 98 is halted during this container changing.

The feeders 98 may be driven in a suitable conventional manner, for example, by a motor 100. Individually operable disengageable clutches 102, or other suitable means, may be provided intermediate the drive motor 100 and each of the screw feeders 98 to selectively permit the cessation of material flow through the screw feeders 98 while changing containers.

Although the invention has been described with reference to utilizing atmospheric pressure for back-flushing purposes, it will be appreciated that alternatively the conduits 62 and 68 could be connected to positive pressure sources, such as gas pumps or cylinders of stored gas, operating at pressures substantially in excess of atmospheric pressure. Also each suction valve may be adapted for venting to atmosphere concurrently with the adjacent gas pressure valve.

In a combination of back-flushing actions, atmospheric pressure may initially be utilized for a predetermined time to provide a first stage of back-flushing in which clogged material is pulled from the perforations by the suction still applied to the other subchamber. Then the back-flushing pressure may be increased by a gas pump in a second stage of back-flushing to, in effect, push any residual clogged material from the perforations.

As another alternative possibility, it would be possible to dispense entirely with the partitions dividing the annular space into two subchambers, and utilize a single chamber extending entirely about the sleeve with periodic applications of positive pressure thereto to back-flush the accumulated particulate material present in the perforations.

Moreover, while in the description of the preferred embodiment of the present invention a flow restrictor, i.e. the flexible coupler, has been shown between the compactor section of the apparatus and the second screw feeder, it should be noted that the second screw feeder may provide adequate back pressure thereby eliminating the need for additional back pressure or flow restricting devices at the outlet end of the compactor section as previously described.

SUMMARY OF ADVANTAGES

It will be appreciated that in following the method and apparatus of the present invention for feeding and compacting finely divided particulate material, certain significant advantages are provided.

In particular, the invention provides a method and apparatus for feeding and compacting finely divided particulate material utilizing a foraminous screen, which provides for continued operation without loss of efficiency due to clogging of the screen.

Another significant advantage is provided by the downwardly extending lip provided about the edge of the conveyor flight which shears off any material held by vacuum against the interior of the sleeve, to provide improved feeding characteristics.

Other advantages are provided by the provision of the non-communicating subchambers and the system of valves connecting the various suction and air pressure conduits, functioning in such a manner as to cause the suction applied to one of the subchambers to assist the action of atmospheric pressure applied to the other of the subchambers to provide a back-flushing pressure differential across the sleeve.

Furthermore, the manner in which the sleeve is simply mounted concentrically in an annular outlet housing obviates the disadvantages of certain earlier structures, exemplified by U.S. Pat. No. 3,269,611 (Komarek) which required the basic hopper structure to be modified by the provision of complicated recessed portions in the main hopper wall itself.

It is also apparent from the foregoing description that the compacted material may be fed to a container filling station with very little loss of compaction, and reentrainment of air between the articles of the material may be prevented by feeding the compacted material into an evacuated container adapted to be connected to the outlet port of the apparatus.

Moreover, the use of plural screw feeders as previously described permits the feeding and compacting of particulate material with a single compacting or densifying section to one or more filling stations without loss of material compaction in transit to a container filling station. Also, although a flow restrictor may be utilized to provide back pressure at the outlet of the densifier section, the use of a second screw feeder eliminates the necessity for such a back pressure device since the second screw feeder provides sufficient back pressure and substantially eliminates the influx of air through the densifier discharge opening as long as flow of material therethrough is not significantly greater than the flow of material through the densifier section.

Back-flushing with gas under controlled temperature and moisture conditions permits greater control of the flow characteristics of the material. Excessive localized material packing with accompanying equipment clogging and non-uniform densifying of the material may be substantially reduced by the use of controlled back-flushing in connection with other features of the invention. It is also apparent that the use of metallic screw feeders provides a thermally conductive path through the material as it is being densified and as it is being conveyed. This also greatly reduces the buildup of heat in the material.

The horizontal disposition of the screw feeders facilitates the regulation of material flow since the force of gravity does not act axially upon the material in either the first or second screw feeder. The filling of impermeable bag containers is also facilitated since the containers may be easily connected to the discharge end of the second screw feeder without the need for container elevating or other positioning means. As material is discharged into the collapsed bag container, the container is expanded to its normal size solely by the material and very little reentrainment of air results since the system is basically a closed system, unexposed to the atmosphere.

Thus, the use of two screw feeders obviates the disadvantages associated, for example, with the dual screw feeder densifying system shown in U.S. Pat. No. 2,985,201 to W. A. Baker wherein the material is discharged directly from a vertical densifier section into a container carried by an elevator means which positions the container relative to the densifier discharge opening. The discharge opening of the Baker device also allows air to be drawn therethrough by the vacuum applied to the densifier section, resulting in reentrainment of air between the particles of the material being discharged into the containers.

Although the invention has been described with reference to one preferred embodiment, it will be appreciated that numerous additions, modifications, substitutions, deletions, and other changes not specifically disclosed may be made which will fall within the purview of the appended claims.

What is claimed is:

1. A method of continuously feeding finely divided particulate material to at least one container filling station while compacting the particulate material utilizing a first rotating screw feeder for advancing the material through a first sleeve passage provided by a stationary foraminous sleeve mounted closely about the first screw feeder and a second rotating screw feeder for advancing the material from the first screw feeder to at least one filling station to thereby prevent loss of compaction, the method comprising the steps of:
   a. mechanically advancing the particulate material along the first sleeve passage with the interstitial air between particles of the material in the foraminous sleeve being at an internal sleeve pressure;
   b. applying, from a suction pressure system, a suction pressure relatively lower than the internal sleeve pressure along the exterior of the foraminous sleeve to withdraw at least a portion of the interstitial air from between the particles of the material through the foraminous sleeve to effect compaction of the material;
   c. intermittently applying a gas pressure relatively higher than the internal sleeve pressure along the foraminous sleeve to back-flush material from the perforations in the foraminous sleeve to prevent clogging thereof;
   d. discharging the material from a discharge end of the first sleeve passage into the second sleeve passage; and,
   e. mechanically advancing the material along the second sleeve passage to an outlet port adjacent the container filling station while maintaining the compaction of the material.

2. The method of claim 1 wherein step (c) includes:
   applying cool, dried air at a pressure relatively higher than the internal sleeve pressure along the foraminous sleeve to back-flush material from the perforations in the foraminous sleeve to prevent clogging thereof and to cool and dry the particulate material advanced along the first sleeve passage.

3. A method of feeding particulate material while compacting the material as defined in claim 1 including the step of:
   maintaining a back pressure on the material being discharged from the first sleeve passage by advancing the material through the second sleeve passage at a flow rate no greater than the flow rate of the material through the first sleeve passage.

4. The method of claim 3 further comprising the steps of:
   discharging the material into a plurality of sleeve passages communicating with the second sleeve passage;
   advancing the material through the plurality of sleeve passages at a collective total flow rate approximately equal to the flow rate of the material through the second sleeve passage.

5. A method of feeding particulate material while compacting the material as defined in claim 3 and further comprising the step of:
   providing non-communicating closed hollow chambers axially extending the length of the first sleeve about different peripherally spaced areas of the first sleeve;
   and wherein step (c) includes:
   applying, while continuing to mechanically advance the material, a gas pressure relatively higher than the internal sleeve pressure along the lateral surface of each of the chambers in turn at predetermined times during which the other of the chambers has suction pressure applied thereto to cause a pressure differential across the perforations to back-flush particulate material from the perforations in the first sleeve to prevent clogging thereof.

6. A method of feeding particulate material while compacting the material as defined in claim 5 and further comprising the steps of:
utilizing an axially advancing screw blade having an axially extending lip flush with the interior surface of the sleeve scraping the adhered material from the interior surface all along the sleeve,
simultaneously spirally blanking off portions of the interior of the sleeve from the vacuum in the area embraced by the axially extending blade lip to diminish the suction force causing the particulate material to adhere to the interior of the sleeve during scraping thereof, and
opening the interior of the sleeve to vacuum in the area following the area embraced by the advancing blade.

7. A method of feeding particulate material while compacting the material as defined in claim 6 and further including the step of:
discharging the material from the second sleeve passage at the container filling station into a substantially evacuated container connected in substantially gas-tight relation to the outlet port of the second passage.

8. A method of continuously feeding finely divided particulate material to a container filling station while compacting the particulate material utilizing a first rotating screw feeder for advancing the material through a first sleeve passage provided by a stationary foraminous sleeve mounted closely about the first screw feeder and a second rotating screw feeder for advancing the material from the first screw feeder to the filling station to thereby prevent loss of compaction, the method comprising the steps of:
a. mechanically advancing the particulate material horizontally along the first sleeve passage with the interstitial air between particles of the material in the foraminous sleeve being at an interval sleeve pressure;
b. applying, from a suction pressure system, a suction pressure relatively lower than the internal sleeve pressure along the exterior of the foraminous sleeve to withdraw at least a portion of the interstitial air from between the particles of the material through the foraminous sleeve to effect compaction of the material;
c. intermittently applying a gas pressure relatively higher than the internal sleeve pressure along the foraminous sleeve to back-flush material from the perforations in the foraminous sleeve to prevent clogging thereof;
d. discharging the material from a discharge end of the first sleeve passage into the second sleeve passage;
e. mechanically advancing the material horizontally along the second sleeve passage to an outlet port adjacent the container filling station while maintaining the compaction of the material and inhibiting the flow of gases through the discharge end of the first sleeve passage; and,
f. discharging material from the outlet port of the second sleeve passage into a substantially collapsed, impermeable container communicating in substantially gas-tight relation with the discharge port, the material thereby expanding the container substantially solely with the material.

9. An apparatus for feeding and compacting finely divided particulate material having interstitial air between the particles, the apparatus comprising,
a housing,
a first tubular sleeve fixedly mounted in said housing, said first sleeve and adjacent interior portions of said housing defining,
at least one closed hollow chamber extending about said first sleeve;
said first sleeve further including,
a plurality of perforations placing said chamber in fluid communication with the interior of said first sleeve;
material feeding means adapted to feed the particulate material axially along said first sleeve with the interstitial air being at an internal sleeve pressure,
suction means connected with said housing in fluid communication with said chamber for selectively applying suction pressure relatively lower than the internal sleeve pressure through said perforations to the interior of said first sleeve to withdraw at least a portion of the interstitial air from the particulate material to effect compaction thereof during feeding;
gas pressure means connected with said housing in fluid communication with said chamber for intermittently supplying gas at a relatively higher pressure than the internal sleeve pressure to said perforations to back-flush particulate material from said perforations to prevent clogging thereof;
first material discharge means mounted at an outlet end of said first sleeve to permit discharge compacted particulate material from said first sleeve;
a second tubular sleeve connected between said outlet end and at least one second material discharge means, the interior of said second sleeve being in fluid communication with said first material discharge means; and,
an axially extending auger concentrically and rotatably mounted in said second sleeve, said auger upon rotation thereof being adapted to feed the compacted particulate material from said material discharge means axially along said second sleeve to said at least one second material discharge means.

10. The apparatus of claim 9 wherein said gas pressure means comprises a source of cool, dried air at a relatively higher pressure than the internal sleeve pressure.

11. An apparatus as defined in claim 9 including impermeable container means adapted to be connected to said at least one second material discharge means, the interior of said container means being in fluid communication with the interior of said second sleeve and said container means and said at least one second material discharge means being connected in substantially gas-tight relation.

12. An apparatus as defined in claim 11 including partition means within said chamber extending between and fixedly secured to said housing and said sleeve, said partition means dividing said chamber into at least two axially extending, non-communicating subchambers extending peripherally about different portions of said sleeve.

13. An apparatus as defined in claim 12 wherein said suction means includes:
first suction means communicating with one of said subchambers and,
second suction means communicating only with the other of said subchambers;
and wherein said gas pressure means includes:
first gas pressure means communicating only with said one of said subchambers; and
second gas pressure means communicating only with said other of said subchambers.

14. An apparatus as defined in claim 13 wherein, said material feeding means includes:
an axially extending shaft concentrically positioned within and spaced from said first sleeve,
an axially extending screw flight secured to said shaft extending generally helically therealong, said flight including,
a peripheral edge close adjacent interior portions of said sleeve,
a lip fixedly secured to said screw flight extending continuously along said peripheral edge, said lip extending axially downstream from said edge and said lip being in contact with adjacent interior portions of said sleeve.

15. An apparatus as defined in claim 13 further including:
a layer of perforate mesh of smaller mesh size than the size of the particles, said layer of mesh contiguously overlying said first sleeve on a surface thereof facing inwardly of said chamber.

16. An apparatus as defined in claim 15 further including:

first and second suction valves connected with said first and second suction means respectively, each of said suction valves upon opening thereof placing the associated one of said first and second suction means in fluid communication with the associated one of said subchambers; and first and second gas valves connected with said first and second gas pressure means respectively, each of said gas valves upon opening thereof placing the associated one of said first and second gas pressure means in fluid communication with the associated one of said subchambers, said first gas valve being opened concurrently with closing of said first suction valve at predetermined times during which said second gas valve is closed and said second suction valve is open, said second gas valve being opened concurrently with closing of said second suction valve at other predetermined times during which said first gas valve is closed and said first suction valve is open.

17. The apparatus of claim 9 wherein said first material discharge means includes means for applying a back pressure to the material in said first sleeve.

18. The apparatus of claim 9 wherein said auger feeds the compacted particulate material through said second sleeve at a flow rate approximately equal to the flow rate of the material through said first sleeve and thereby applies a back pressure to the material discharged from said first material discharge means.

19. The apparatus of claim 18 including a plurality of second material discharge means and a plurality of screw feeders in fluid communication with the interior of said second sleeve by way of associated ones of said plurality of second material discharge means, each of said plurality of screw feeders individually feeding the material from the associated one of said second material discharge means to a container feeding station at a flow rate less than the flow rate of material through said second sleeve.

20. The apparatus of claim 19 wherein the total flow rate of material through said plurality of screw feeders together is approximately equal to the flow rate of material through said second sleeve.

21. The apparatus of claim 19 wherein said plurality of screw feeders are spaced relative to each other axially along said second sleeve and wherein the total flow rate of said plurality of screw feeders together is greater than the flow rate of material through said second screw feeder.

22. The apparatus of claim 21 including container filling means at one end of each of said plurality of screw feeders for filling containers with the material fed through said screw feeders and means for selectively driving said plurality of screw feeders, whereby a selected screw feeder can be stopped to replace a full container with an empty container.

* * * * *